May 1, 1923. Re. 15,589

C. CHISHOLM

ADDRESS PRINTING MACHINE

Original Filed Oct. 21, 1916 5 Sheets-Sheet 1

INVENTOR
Clifton Chisholm,
BY Baker & Maekin,
ATTORNEYS

May 1, 1923. Re. 15,589

C. CHISHOLM

ADDRESS PRINTING MACHINE

Original Filed Oct. 21, 1916 5 Sheets-Sheet 2

INVENTOR
Clifton Chisholm,
BY Baker & Moeklin,
ATTORNEYS

May 1, 1923. Re. 15,589

C. CHISHOLM

ADDRESS PRINTING MACHINE

Original Filed Oct. 21, 1916 5 Sheets-Sheet 3

INVENTOR
Clifton Chisholm
BY Bakewell & Macklin,
ATTORNEYS

May 1, 1923. Re. 15,589

C. CHISHOLM

ADDRESS PRINTING MACHINE

Original Filed Oct. 21, 1916 5 Sheets-Sheet 4

INVENTOR
Clifton Chisholm
BY Baker & Macklin
ATTORNEYS

May 1, 1923. Re. 15,589

C. CHISHOLM

ADDRESS PRINTING MACHINE

Original Filed Oct. 21, 1916 5 Sheets-Sheet 5

INVENTOR

Clifton Chisholm

BY Baker & Macklin,

ATTORNEYS

Reissued May 1, 1923. Re. 15,589

UNITED STATES PATENT OFFICE.

CLIFTON CHISHOLM, OF CLEVELAND, OHIO, ASSIGNOR, BY MESNE ASSIGNMENTS, TO THE AMERICAN MULTIGRAPH COMPANY, OF CLEVELAND, OHIO, A CORPORATION OF OHIO.

ADDRESS-PRINTING MACHINE.

Original No. 1,285,622, dated November 26, 1918, Serial No. 126,829, filed October 21, 1916. Application for reissue filed November 24, 1920. Serial No. 426,305.

*To all whom it may concern:*

Be it known that I, CLIFTON CHISHOLM, a citizen of the United States, residing at Cleveland, in the county of Cuyahoga and State of Ohio, have invented a certain new and useful Improvement in Address-Printing Machines, of which the following is a full, clear, and exact description.

This invention relates to the kind of address printing machines in and by which address plates, stored in one container, are automatically withdrawn therefrom, one by one, and the addresses on said several plates caused to be printed on envelops or the like.

The present invention has more particularly to do with the means by which address plates are removed from storage and loaded into the machine, and are automatically moved through the machine so as to print their impressions on envelops or paper carried through the machine by other but synchronously acting mechanism and are finally collected for removal from the machine and returned to storage.

And the invention consists in the combinations of parts by which those and other desired results are attained, as illustrated by the embodiment shown in the accompanying drawing and hereinafter described, the essential novel features being pointed out definitely in the appended claims.

Figure 1:
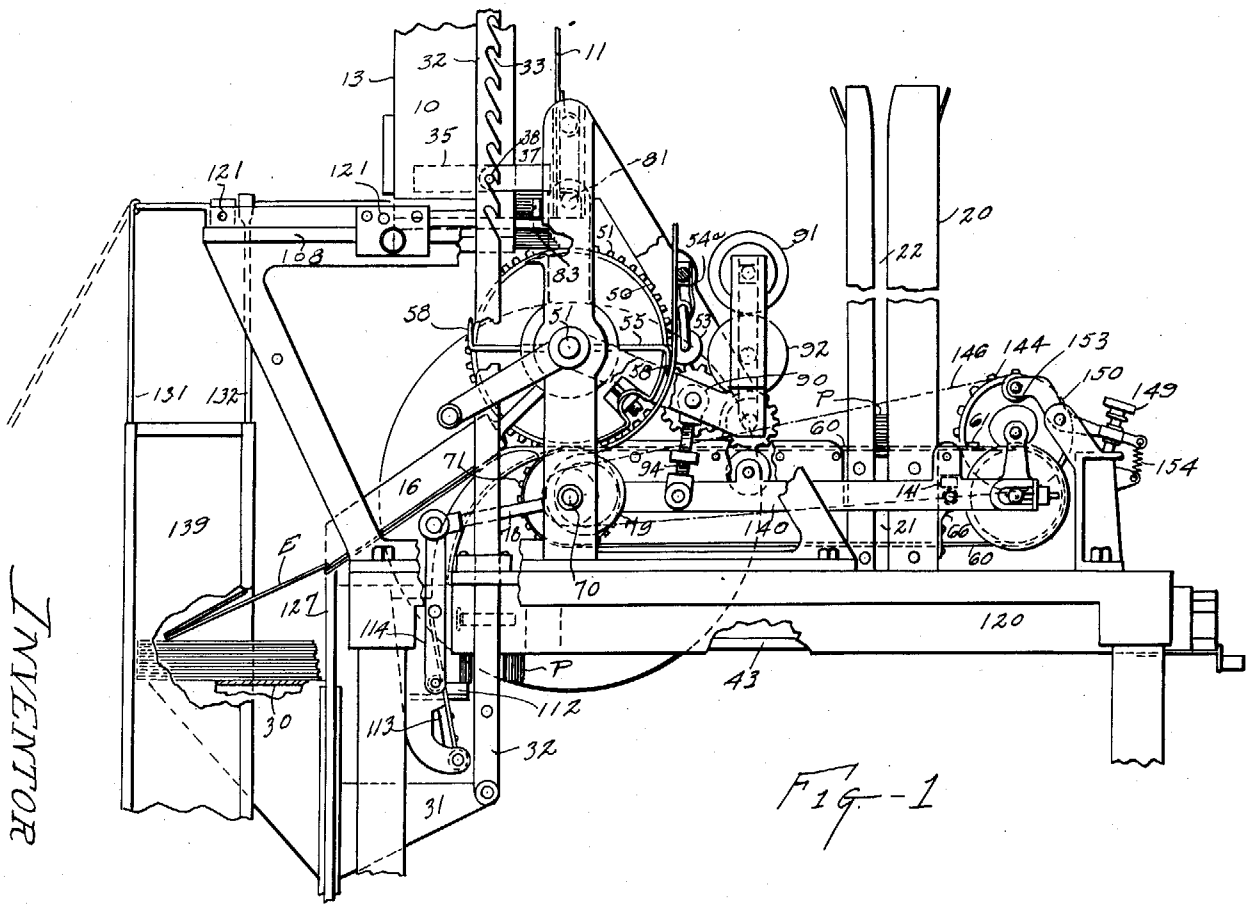
Figure 2:
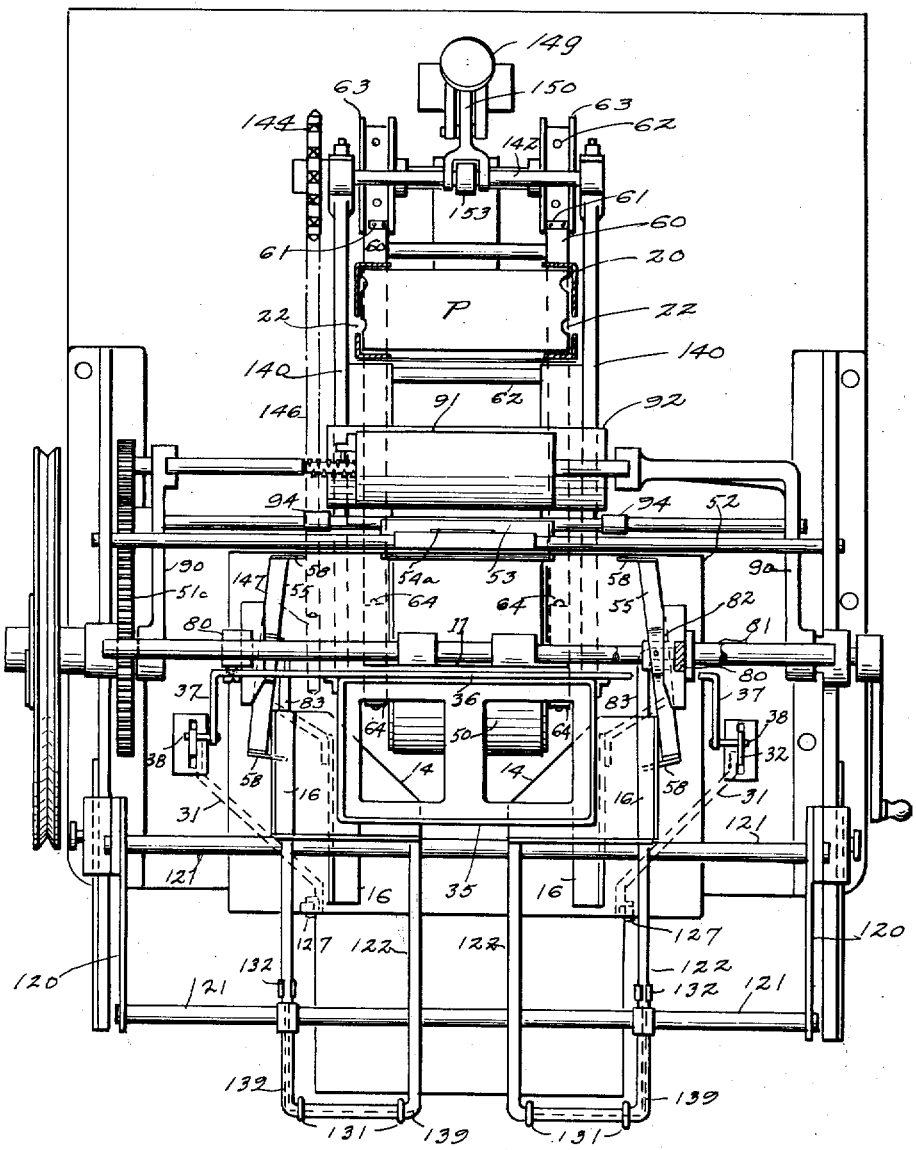
Figure 3:
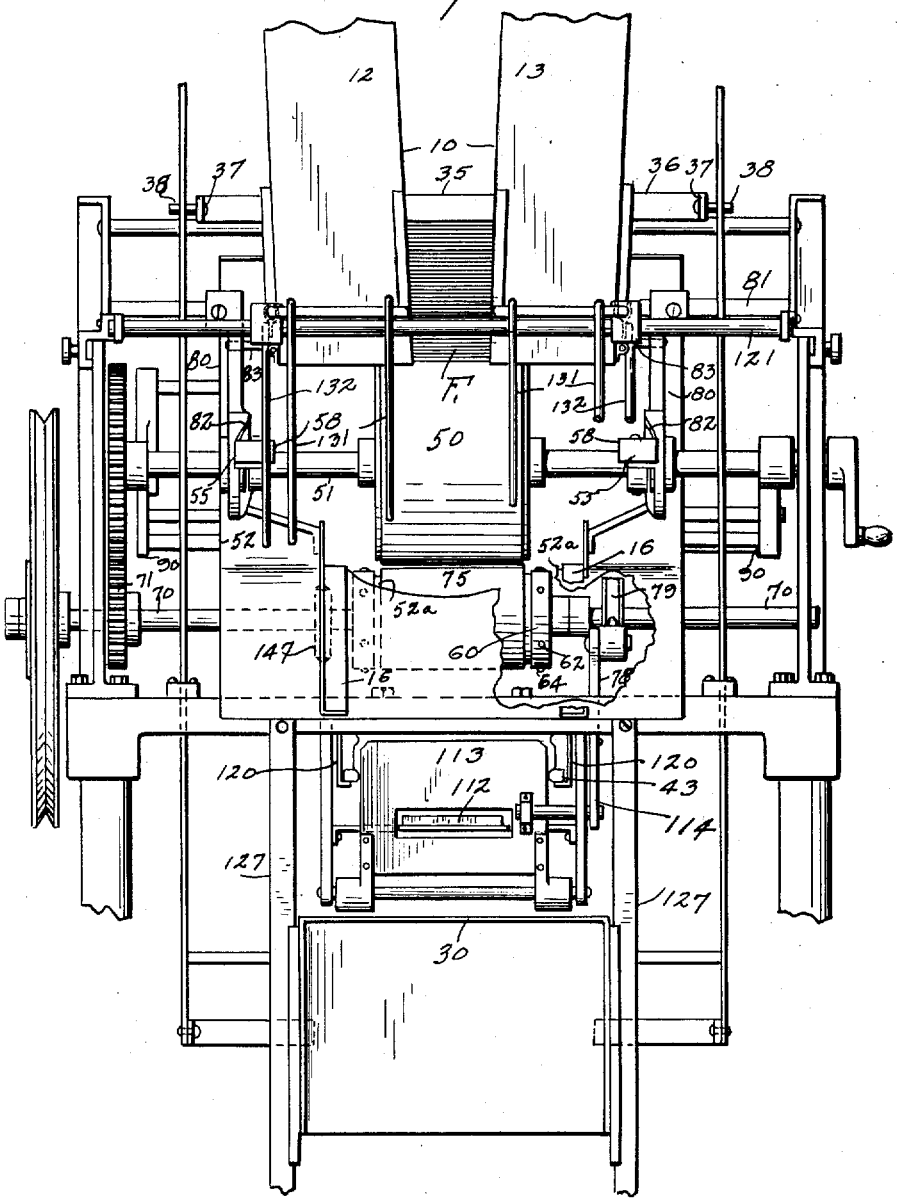
Figure 4:
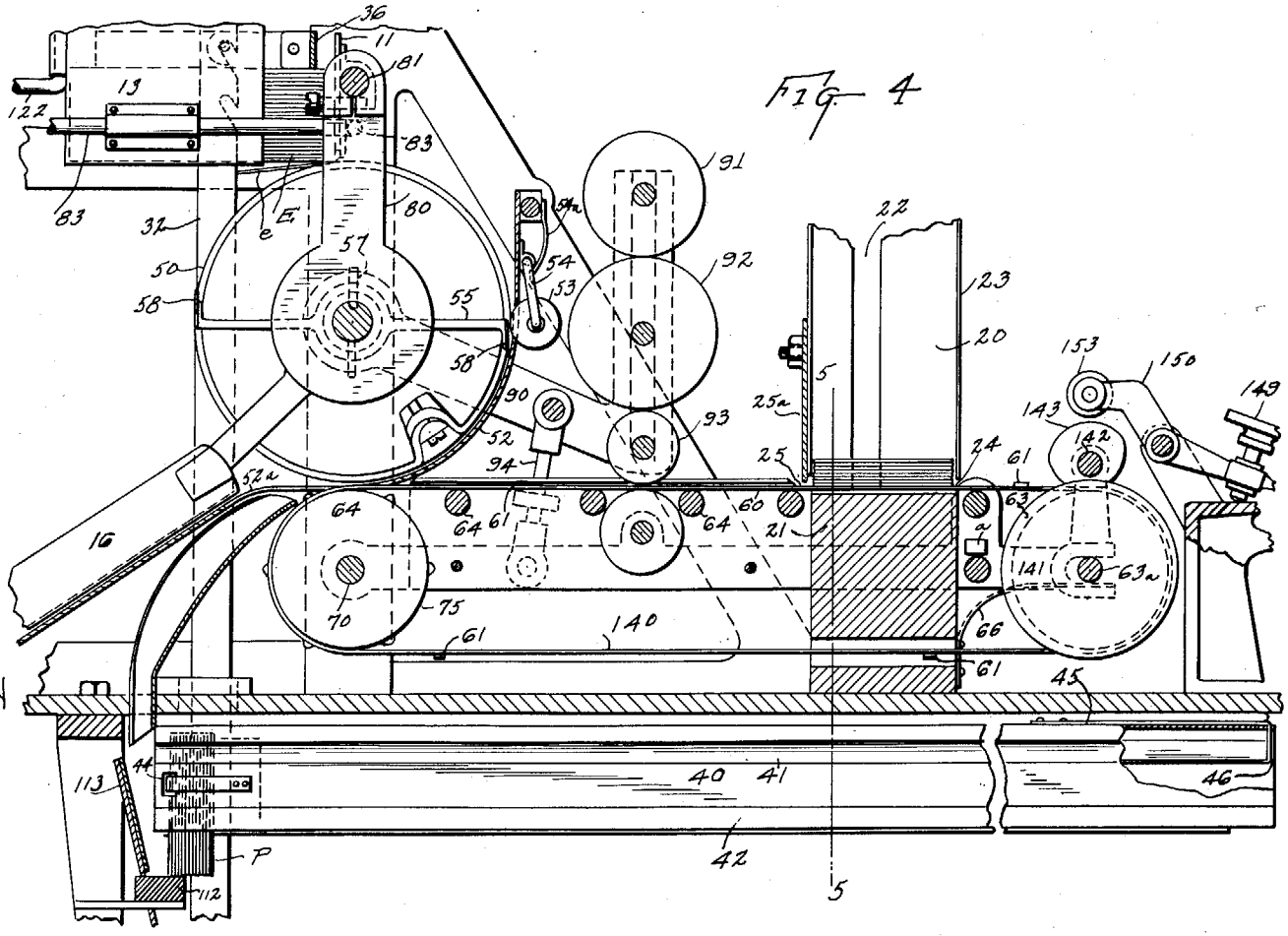
Figure 5:
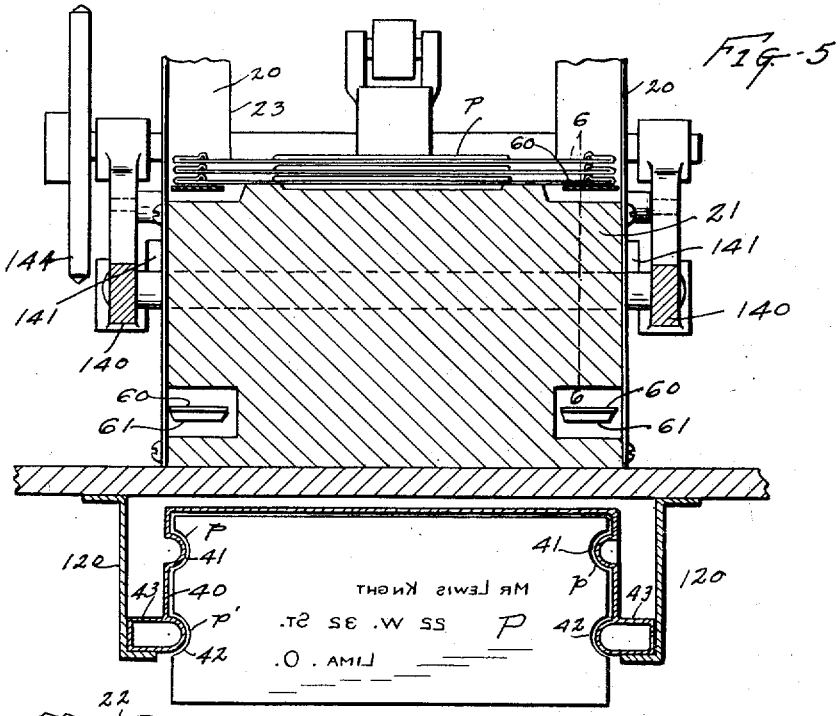
Figure 6:
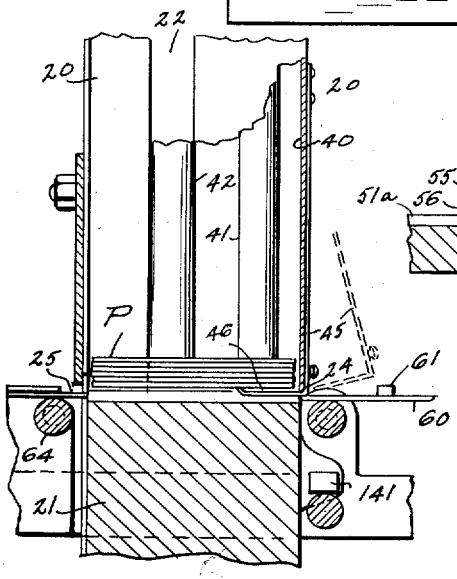
Figure 7:
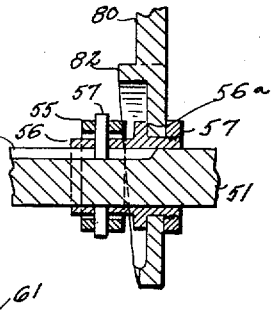

In the drawings, Figure 1 is a side elevation of a machine of the character specified, in which the present invention is embodied; Fig. 2 is a plan view of the said machine; Fig. 3 is an end elevation with some parts broken away from the left end of Fig. 1; Fig. 4 is a sectional side elevation of said machine; Fig. 5 is a sectional end view in the plane of line 5—5 on Fig. 4; Fig. 6 is a vertical section of a view in the plane of line 6—6 on Fig. 5; Fig. 7 is a longitudinal sectional view of a part of the main driving shaft and cam carrying brackets 80 and through parts adjacent thereto.

10 represents a hopper adapted to contain a stack of envelops E, which are placed therein, with their flaps down and pointed toward the left.

Mechanism, which will be presently described, withdraws the envelops, one by one, from the bottom of the stack in the said hopper, and carries them into printing relation with certain printing plates P, and delivers them, after the addresses have been printed thereon, onto a platform 30.

20 represents a hopper in which a stack of address plates P are placed, and from which they are withdrawn, one by one, from the bottom of the stack by mechanism which carries them into printing relation with the envelops.

40 represents an address plate drawer into which said address plates are severally delivered directly they have been used for the above stated purpose. The plates P, between uses thereof, are stored or filed away in this drawer; which drawer likewise affords a convenient means for loading the plates which it contains into said plate hopper 20.

50 represents a rotatable cylindrical platen on which the envelops are carried, after they are withdrawn from the hopper 10, into printing relation with the printing plates as the latter are being carried along beneath said platen by the mechanism provided for that purpose from the plate hopper.

The plate hopper 20 is a vertical rectangular tube made of thin metal which is fixed to and projects upward from a fixed block 21 that serves as the bottom of the hopper. In the front and rear walls of the hopper are the vertical slots 22 which are there to permit the insertion into said hopper from the top thereof of one of the drawers 40 containing a stack of address plates, each of said drawers having on each side thereof a longitudinal rib which said slots accommodate as the drawer is moved into or from said hopper. Likewise there is a vertical slot 23 in the right side of this hopper which is there to permit the withdrawal of said drawer; and is necessary because otherwise the spring arm 46 could not be pulled out to release the address plates and leave them in the hopper when the drawer is withdrawn, nor could the drawer be withdrawn while the spring arms remain in the withdrawn position shown in Fig. 6 by dotted lines.

Two plate feeding belts 60, which may be made of thin metal tape or of any other suitable material, pass horizontally into said hopper just above the top of the bottom block 21,—there being slots 24 in the right wall of the hopper to permit the belt and the feed lugs 61 thereon to pass; and there being also a slot 25 which extends entirely across the left wall of the hopper just above said block 21 through which said belts may also pass, and through which they may drag the bottom address plate in the hopper. The height of this slot is such that only one address plate may at the same time, pass through it. Fixed to the outer face of each belt 60 at suitable intervals are the plate feeding lugs 61. Each belt is preferably formed with suitably placed holes 62 which are to receive the sprocket teeth carried by the sprocket wheels 63, 64, over which said belts run. The sprocket wheels 63 are fixed to an idling shaft 63[a], but the sprocket wheels 64 are fixed to the main driving shaft 70 and are driven thereby. On this shaft is a gear 71 that meshes with the gear 51[c] that is fixed to the shaft of the rotary platen 50 whereby the latter may be driven.

In the embodiment shown the conveyer belts are adapted to carry one plate to the printing position for each complete rotation of the sprocket wheel 64 on the driving shaft and accordingly the lugs 61 are positioned a distance apart corresponding to the periphery of a sprocket wheel 64. The rotary platen 50, above mentioned, and envelop feeding mechanism which coacts with it, are adapted to feed two envelops for each rotation of this platen, and accordingly this platen makes a half rotation for each complete rotation of the sprocket wheel 64. Therefore, the gear 51[c] on the shaft of the rotary platen has twice the diameter of the gear 71 on the driving shaft 70.

The mechanism shown for successively withdrawing the envelops from the bottom of the stack and feeding them about the platen 50 into coaction with the plate and a pressure roll 75 on the shaft 70 is shown, described, and claimed in my Patent No. 1,285,623, issued November 26, 1918. It will be convenient, however, to describe first this portion of the complete machine shown.

The successive withdrawal of envelops E from the bottom of the stack within the hopper 10 is effected by two feed arms 55, which are rotatable in unison with the platen 50 and are located one more or less closely adjacent each end thereof. Coaxial with the gear 51[c] are two sleeves 56 which are located adjacent opposite ends of the platen. These sleeves have a driving connection with the shaft, but are adjustable lengthwise thereof. Each feed arm 55 is pivoted to one of these sleeves on an axis which is diametrical with respect to said shaft. One of the pivot pins 57 goes through the sleeve into a longitudinal groove 51[a] of said shaft, thereby producing a tongue and groove driving connection between the sleeve and shaft. Each of these feed arms extends on both sides of the shaft; and on each end of each arm is an envelop engaging finger 58 which projects from said arm toward the platen. Each sleeve 56 not only embraces the shaft 51 but is rotatable within a hanger 80, but has no independent endwise movement with respect to said hanger. An annular shoulder 56[a] on sleeve 56 engages one face of said hanger while a nut 57 which screws onto said sleeve engages the other face of said hanger.

The two hangers 80 are suspended from and slidable upon a transverse fixed bar 81, and they are respectively connected with the two parts 12, 13, of the envelop hopper. These hangers may be moved transversely on said bar toward and from the platen for adjustment, and the two parts 12, 13, of the envelop hopper move with them, but they are clamped fixedly to said bar in any desired position, when the machine is in operation. Each of these hangers carries a face cam 82 so shaped and placed that it will engage the adjacent feed arm 55; and as the sleeve 56 is rotated with the shaft 51 said cams will rock said feed arms so as to carry toward one another those ends of said arms which are approaching the top of their path; that is to say, are approaching the bottom of the envelop hopper. Obviously, at the same time, the other ends of said arms will move away from one another so as to release any envelop which they may have been engaging. These arms 55 are of such length that as they are carried up under the envelop hopper, the fingers 58 thereon will go into the angular space between the lower envelop E and its down hanging flap *e*, and will engage the bend which connects the flap with the envelop. The continued rotation of these arms will, therefore, withdraw the lowest envelop to the right from the hopper, and carry it around with, and in substantial contact with the outer surface of the platen, beneath the lower edge of a guard plate made of flexible rubber,—the function of this guard plate being to prevent the simultaneous withdrawal of more than one envelop. A fixed cover shield 52 adjacent to the platen helps to bend the envelop and hold it in substantial contact with the surface of the platen. There is also a pressure roll 53 which projects through a slot in said shield and is spring-pressed against the envelop. This roll is mounted in the lower end of a swinging frame 54, the said arms of which are pivoted at their upper ends to two brackets fastened to the right side of said shield; and this frame is under the influence of the spring 54[a] which presses the roll against the envelop which is embracing the platen.

As an envelope is being dragged along by the arms 55 in contact with the platen, its lower (front) face is brought into contact with the printing characters on the upper face of an address plate P which has been drawn from the bottom of the stack of address plates in the hopper 20, —the movement of the envelope and the printing plate being so timed by the described mechanism as to bring this about. The printing plate and the envelop are pressed into contact as they pass together between the platen and the pressure roll 75 which is located just below the platen and may be fast to the shaft 70. The upper leg of each feed belt runs over a plurality of rollers 64 by which said feed belts are upheld, and are able to support the printing plate.

As each printing plate is moving from the hopper toward the platen it passes under an inking roll 93 which lies directly over an idler roll 62 and is such distance therefrom that the printing roll will of necessity ink the characters on the upper side of the address plate. The inking roll is mounted in a swinging frame, the side members 90 of which are hung on the platen shaft and project to the right therefrom. An ink holding roll 91 is also mounted on said swinging frame, and so also is an ink distributing roll 92, which lies between and in contact with the ink holding roll and the inking roll so as to transfer ink from one to the other. The particular construction and disposition of the type inking rolls is not material to the present invention and any suitable inking mechanism may be employed. The envelops carried along with the platen by the feed arms 55, and the printing plates carried along by the feed belts pass between the platen and the roller 75, and are properly pressed against one another so as to cause the address on the plate to be printed on the envelop. The shield plate 52 is cut away below the platen in its middle portion so that the address plates may print the envelops through this opening, the sides of this shield plate however, remain and always support the end portions of the envelops, while they are being printed. The lower part 52ª of this shield plate lies at the left of the platen and inclines downward as shown, the envelops after being printed on slide down this inclined continuation 52ª of the shield plate until the envelop drops onto the envelop receiving platform 30, or more particularly onto the top envelop of the pile of envelops on said platform. The envelops as they slide down this inclined plate 52ª slide between guide bars 16, which overlie plate 52ª, said guide bars being connected respectively to the two hangers 80 so that they will always be at the required distance apart, because when the hangers are moved lengthwise of the shaft as and for the purpose stated, these guide bars 16 will be similarly moved.

Each printing plate as it emerges from between the platen and the pressure roll 75 falls into a curved chute down which it falls onto a rubber buffer plate 112, and between the open end of a drawer 40 and a vibrating packer 113, by which said plates are pushed from said buffer plate into said drawer. This packer is pivoted at its lower edge on a transverse fixed pivot, and is actuated by a lever 114 which is pivoted to a fixture and is connected at its lower end to said packer. The upper end of said lever is connected to an eccentric strap 78 which embraces an eccentric 79 on the driving shaft 70.

The plate holding drawer 40 is made of sheet metal bent to form two sides and a top as shown particularly in Fig. 5. Each of these drawers has two outwardly extended ribs 43 upon which the drawer is supported upon the fixed brackets 120, and in operative position to receive the address plates in the manner before stated. Inwardly bent longitudinal ribs 41 are preferably formed lengthwise of this drawer, and they are intended to go into corresponding notches *p* in the sides of the address plates. Two other corresponding inwardly directed ribs 42 are provided to go into two other notches *p* in the sides of the address plates, so that said address plates will be held upright therein. In the sides of the drawer are the bevel-ended spring detents 44 which prevent any backward movement of one of the plates after the packer has pushed it past the detent jaws.

Extending part way across what is the right hand end of this drawer when it is in the machine, a plate retaining arm 46 projects, which arm is connected with a long flat spring 45 fastened to the outer face of the top side of this drawer. This is to prevent the plates from dropping out of this end of the drawer when the drawer is held with that end down as it must be when one loads the hopper 20. To load the hopper, the drawer filled with plates is put vertically downward into the hopper, with the said right hand end thereof down. When the plates are resting on the bottom of the hopper one takes hold of the knob on the outer face of the spring 45 and draws it outward, thereby withdrawing arm 46 from beneath the address plates. While it is in this position the drawer is withdrawn from the hopper and the plates are left therein. The spring 45 which is then extended outward from the drawer is movable in the vertical slot 23 in the right side of said hopper.

The envelop hopper 10 is formed of two upright angle plates 12, 13, each of which is connected with a triangular bottom plate 14. This hopper occupies a position above and to the left of and close to the platen cylinder. But the two above mentioned parts 12 and 13 of the envelop hopper are adjustable toward and away from each other, and toward and away from said platen cylinder in order that the hopper may hold envelops of various sizes in proper relation to the platen cylinder and to the means for successively withdrawing the bottom envelop from said hopper.

Each of these two members 12, 13, which comprise the envelop hopper is slidably mounted on a rod 83 that it fixed to and extends horizontally to the left from the associated hangers. These hopper members may be moved along this rod to positions determined by the width of the envelop.

Now, when it has been determined what length envelops are to be addressed the two hangers 80 are moved to what extent may be necessary toward and away from each other. As they so move the front and rear members 12 and 13 of the hopper are caused to move toward or from each other until they occupy a position such that the hopper is adapted to hold the envelops to be addressed. When the hopper members are in this position, the feed arms will likewise be in a proper position to co-operate with these particular envelops because the sleeves which carry these feed arms and the cams which operate these feed arms are mounted on the hangers and move with them.

In order that the envelop hopper members shall remain upright as they are adjusted, a rectangular frame is mounted to slide horizontally on the fixed framework of the machine. This frame includes side members 120, and two transverse members 121. A U-shaped bar 112 fixed to each hopper section extends to the left therefrom, and rests upon the two transverse bars 121.

The platform 30 upon which the addressed envelops are delivered is mounted to slide up and down upon the two fixed guide bars 127. It has projecting to the right therefrom two bracket arms 31 each of which is connected to the lower end of two upwardly extended bars 32 which are located adjacent to the front and rear sides of the envelop hopper; and are provided with a plurality of inclined notches 33.

There is a follower 35 provided for resting upon a pack of envelops in the hopper 10. This follower is fixed to a bar 36 which extends forward and backward horizontally to the right of the hopper, and it has two arms 37 which extend to the left, and each arm has an outwardly projecting pin 38. When a stack of envelops are put into the hopper this follower is placed upon the top of the stack, and then the two vertical bars are hung upon these outwardly projecting pins 38. The particular notch 33 in the said bars which is to engage with these studs depends of course upon the height of the pile of envelops, because these arms support the platform 30 and this platform should be in a position that the envelops will go onto it nicely as they are discharged from the inclined plates. Therefore, regardless of how high a stack of envelops is put in hopper 10, the platform 30 being adjusted into proper position at the beginning of the operation of printing this stack of envelops will move down just as fast as the height of the pile of envelops in hopper 10 is lessened, so that always the top envelop on the platform 30 will be in proper relation to receive the envelop which is being delivered from the inclined plates.

There is a three-sided shield 139 which embraces the platform on the front, rear and left sides thereof, and this serves to keep any of the envelops from falling off of the platform. This shield which is made of two independent angle irons is secured to four rods, 131, 132, two of which, 131, are pivotally hung at their upper ends from the U-shaped bar 122. The other two rods 132 have spring clips at their upper ends for engagement with said bar, and serve to lock said shield in operative position. Obviously, when the hopper members are moved to right or left to adapt the hopper for envelops of different sizes, the shield will be correspondingly adjusted with respect to the platform. When it is desired to remove a stack of addressed envelops from platform 30, one pulls the rods 132 loose from the bar, and swings the shield to the left out of the way.

Unless the envelops together have a width greater than one half the circumference of the platen 50, two envelops will be withdrawn from hopper 10 at each revolution of the platen. The feed lugs on the address plate feeding belts are so positioned that they will feed two address plates toward the printing position during each revolution of said platen and in such wise as to meet the two envelops.

However, if the width of the envelop is greater than one half of the circumference of the platen roll, then only one envelop will be withdrawn from the hopper during each revolution of said platen, because when, say, (referring to Fig. 4) the right end of two feed arms as shown in this figure are engaging one of these wide envelops, and carrying it around, the feed fingers at the other end of these arms will go beneath the same envelop instead of engaging the flap of the next envelop above it.

Therefore, while only one envelop is being fed during each revolution of the platen it is desirable to have only one printing plate removed from the plate hopper during a revolution of the platen. To effect this result automatically, there are two side frame members 140, which are hung upon the driving shaft 70, and extend to the right therefrom; and in their rear ends is mounted the shaft in which the two right hand belt sprockets 63 are fixed. The frame which carries the ink holding, ink distributing, and inking rolls is connected with these two side frame members by links 94 which are adjustable in length, so that whichever position this frame may occupy the inking rollers will be in proper working relation to the feed belts. The several belt supporting rollers 64, are mounted on this rocking frame and so is the pressure roller 62 beneath the inking roll.

The right end of this frame is under the influence of a spring 66 tending to swing it up as far as it can go, that is to say, until further upward movement is prevented by the engagement of said side frame members with certain fixed stops, 141. When the frame is in this position the belts are in position to withdraw the bottom plate from the hopper whenever a feeding lug enters said hopper. Mounted on the right end of this swinging frame above the sprockets is a shaft 142 on which is a cam 143, and to which a driving sprocket 144 is fixed. A sprocket belt 146 transmits the rotary motion to the shaft from a sprocket 147 fixed to the driving shaft 70, the latter sprocket being one half the diameter of sprocket 144, whereby the latter and its shaft will rotate half as fast as the driving shaft.

Mounted on a fixture is a rocking frame 150, which includes two arms, one of which carries an idler roll 153 that may or may not engage the cam 143. A spring 154 holds the frame normally in position such as prevents the roll 153 from being touched by the cam. But by an adjusting screw 149 this frame may be rocked to a position such that the cam will engage said roll 153. Therefore, during each rotation of said cam shaft, the entire frame will be rocked down in opposition to the spring 66; and when the frame is down, the belts 60 will be so depressed that the lugs 61 thereon will pass through the plate hopper but will not strike the lowest plate. Before the next feed lug comes along the rotation of the cam will permit the spring 66 to swing the frame upward, to the position shown such that the lugs 61 will engage an address plate. Therefore alternate feeding lugs will engage and withdraw an address plate, while the intermediate lugs will pass beneath and out of contact with the lowest address plate.

I claim:—

1. In an address printing machine, the combination of a conveyer having spaced lugs for feeding address plates, a driving wheel for said conveyer, a rotary platen adapted to coact with address plates fed by the conveyer and having a periphery which is longer than the periphery of said driving wheel and a multiple thereof, said lugs being spaced a distance apart proportional to the periphery of said driving wheel, and means controllable at will to vary the number of address plates fed for each rotation of the platen.

2. In an address printing machine, the combination of a belt conveyer for address plates, a wheel over which said conveyer passes, lugs on the conveyer spaced a distance apart determined by the periphery of the wheel, a platen geared with said wheel and having a periphery which is longer than that of said wheel and is a multiple thereof, and means controllable at will for feeding for each rotation of the platen one or more address plates.

3. In an address printing machine, the combination of a conveyer having spaced lugs for feeding address plates, a driving wheel for said conveyer, a rotary platen adapted to coact with address plates fed by the conveyer, and having a periphery which is at least twice that of the periphery of said driving wheel, means for causing said platen to carry on each rotation as many envelops as its periphery is times that of said wheel, and means for feeding for each rotation of the platen either one address plate or a number of address plates equal to the number which the periphery of the platen is times the periphery of said wheel.

4. In an address printing machine, the combination of a magazine for address plates, a conveyer belt adapted to travel transversely thereof, a wheel over which the belt passes, lugs equi-distant on the belt and spaced a distance based on the periphery of said wheel, said lugs being a greater distance apart than the width of the plate carried in the magazine, an envelop feeding device including a rotary platen geared with said wheel and having a diameter which is at least twice of that of said wheel, the gears on the wheel and platen being proportioned according to the diameter of said members, and means whereby the feed by said belt lugs may be varied.

5. The combination of a pair of conveyer belts, side by side, and having plate feeding lugs thereon, a pair of wheels over which said belts run, an impression platen between said wheels, an envelop feeding platen coacting with said impression platen, and having a diameter greater than that of the wheel and a multiple of the diameter of said wheels, means for feeding as many envelops for each rotation of said envelop platen as its diameter is times the diameter of said wheels, and means controllable at will for feeding for each rotation of the envelope platen one address plate or a number of address plates equal to the quotient obtained by dividing the diameter of the envelope platen by the diameter of said wheel.

6. The combination of a pair of conveyer belts, side by side, and having plate feeding lugs thereon, a pair of wheels over which said belts run, a shaft on which the wheels are mounted, an impression platen carried by said wheels, an envelop feeding platen surmounting said impression platen, and having a diameter which is at least twice the diameter of said wheels, and means for feeding for each rotation of said envelop platen one envelope and one address plate or as many envelopes and as many address plates as the diameter of the envelope platen is times the diameter of said wheels.

7. In an address printing machine, the combination of a magazine for address plates, conveyer belts adapted to travel transversely thereof, wheels over which the belts pass, lugs equi-distant on the belts and spaced a distance based on the periphery of said wheels, a shaft carrying said wheels, a platen of the same diameter as the wheels and located between them in said shaft, an envelop feeding device including a rotary platen geared with said wheels and having a diameter which is twice that of said wheels, the gears on the wheel and said rotary platen being proportioned according to the diameter of said members, and means controllable at will for feeding one or two address plates for each rotation of the platen.

8. In an addressing machine, the combination of an address plate hopper, a platen roll, means thereon for successively taking envelopes from said hopper, a pressure roll having one half the diameter of said platen and revolving at the same peripheral speed, means for feeding plates from said plate hopper separately between said rolls whereby one plate will be delivered at every revolution of said pressure roll, and means for automatically causing feed at the rate of one plate for every two revolutions.

9. In an address printing machine, a rotatable platen, a cooperating pressure roll, an address plate hopper, a feed belt actuating sprocket on the same axis with said pressure roll, a swinging frame which is pivotally supported on an axis which is coincident with the axis of said sprocket and which extends past said plate hopper, a sprocket rotatably mounted in the free end of said swinging frame, a feed belt which runs over said sprockets and passes through the lower end of the hopper and has fixed to it a plurality of plate-engaging lugs, and means to rock said frame up or down whereby said lugs will or will not engage the lowest address plate in said hopper.

10. In an address printing machine, the combination of an address plate conveying wheel, a paper conveying wheel coacting therewith and having a diameter which is a multiple of the diameter of the address plate wheel, and means for varying the feed to cause impression by either one address plate or a number of address plates equal to the number which the diameter of the paper feeding wheel is times the diameter of the address plate feeding wheel.

11. In an address printing machine, the combination with means for feeding address plates, of a roller across which the plates travel, a paper feeding mechanism having a drum coacting with the roller which drum has a diameter which is a multiple of that of the roller, and means for varying the feed of the plates whereby one cycle of operation may be accomplished with different numbers of address plates as desired.

12. In an addressing machine, the combination of means for feeding address plates, a roller across which the plates are fed, a cooperating roller having twice the diameter of the roller first mentioned, and means for varying the feed to present either one or two plates as desired to the action of the two rollers for each cycle of operation.

13. The combination with means for holding individual address plates, of a roller, means for feeding the plates across the roller, a coacting paper feeding roller, the diameter of which is a multiple of that of the roller first mentioned, and means variable at will for causing on each cycle of operation the impression of either one address plate or a plurality of address plates 14. The combination of two rollers, one having a diameter which is a multiple of the other, means for feeding address plates and articles to be printed between said rollers, and means controllable at will for feeding for each cycle of operation either one address plate or as many address plates as the diameter of the larger roller is times that of the smaller roller, whereby on each cycle of operation either one article or a plurality of articles may be printed.

15. In an address printing machine, the combination of an address plate hopper, a plate feeding belt having on its outer surface a plurality of equally spaced plate feeding lugs, said belt being arranged in such wise that its upper leg passes through the lower end of the hopper and in such position that normally each lug will engage the lowest address plate and carry it out of said hopper and onward to the printing position, means to drive said belt, and means acting automatically to depress and raise the upper leg of said belt and thereby to cause alternate feed lugs to pass below and out of contact with the address plates and to cause the intermediate lugs to engage with said address plates.

16. In an address printing machine, the combination of an envelop hopper, an adjacently placed rotatable platen, a co-operating pressure roll, means, rotatable in unison with said platen to withdraw envelops singly from said hopper and carry them between said platen and pressure roll an address plate hopper, a plate feeding belt passing through the lower end of said hopper and carrying a plurality of lugs adapted to engage the lowest address plate in said hopper and to carry it out of the hopper,—which belt passes from said hopper between the platen and pressure roll, means acting automatically to raise and lower that end of said feed belt which passes through the lower end of said hopper to alternately allow said lugs to engage the lowest address plate or to pass below said plate without engaging therewith.

17. In an address printing machine, the combination of an envelop hopper, an adjacently placed rotatable platen, a co-operating pressure roll, means rotatable in unison with said platen, to withdraw envelops singly from said hopper and carry them between said platen and pressure roll, an address plate hopper, a feed belt actuating sprocket which is fixed to and rotatable with said pressure roll, a swinging frame which is pivotally supported on an axis which is coincident with the axis of said sprocket and which extends past said plate hopper, a sprocket rotatably mounted in the free end of said swinging frame, a feed belt which runs over said sprockets and passes through the lower end of the hopper and has fixed to it a plurality of plate-engaging lugs, and means to rock said frame up or down whereby said lugs will or will not engage the lowest address plate in said hopper.

18. In an address printing machine, the combination of an envelop hopper, an adjacently placed rotatable hopper, a co-operating pressure roll, means rotatable in unison with said platen to withdraw envelops singly from said hopper and carry them between said platen and pressure roll, an address plate hopper, a feed belt actuating sprocket which is fixed to and rotatable with said pressure roll, a frame which is pivotally supported on an axis which is coincident with the axis of said sprocket and which extends past said plate hopper, a sprocket rotatably mounted in the free end of said swinging frame, a feed belt which runs over said sprockets and passes through the lower end of the hopper and has fixed to it a plurality of plate-engaging lugs, and means to automatically rock the free end of said frame up and down to cause alternate lugs on said feed belt to engage or pass below the lowest plate in said hopper.

19. In an address printing machine, the combination of an envelop hopper, an adjacently placed rotatable platen, a co-operating pressure roll, means rotatable in unison with said platen to withdraw envelops singly from said hopper and carry them between said platen and pressure roll, an address plate hopper, a feed belt actuating sprocket which is fixed to and rotatable with said pressure roll, a frame which is pivotally supported on an axis which is coincident with the axis of said sprocket and which extends past said plate hopper, a sprocket rotatably mounted in the free end of said swinging frame, a feed belt which runs over said sprockets and passes through the lower end of the hopper and has fixed to it a plurality of plate engaging lugs, and means to rock said frame up or down whereby said lugs will or will not engage the lowest address plate in said hopper, a pivoted frame carrying a plate inking roller, and connections between the two pivoted frames.

20. In an address printing machine, an address plate hopper having a vertical slot in its front and rear walls extending from top to bottom and having another vertical slot in one of its side walls, a bottomless plate drawer formed without ends and having on each side an external longitudinal rib adapted to fit respectively in the slots in the front and rear walls of said hopper whereby said drawer is removably supported within said machine, an arm extending across one open end of said drawer to prevent the plates from falling out of the same when the drawer is held with that end down, a flat spring connecting said arm with said drawer and disposed to enter the vertical slot in the side wall of the hopper when the arm connected with said flat spring is withdrawn from the drawer, and means for withdrawing the address plates singly from said hopper and delivering them into the unobstructed open end of said drawer.

21. In an address printing machine, an address plate hopper having a vertical groove in its front and rear walls extending from top to bottom and having another groove in one of its side walls, a bottomless plate drawer formed without ends and having on each side an external longitudinal rib adapted to enter and move in one of the grooves in the front and rear walls of the hopper whereby said drawer is removably supported within said machine, an arm extending across one open end of said drawer to prevent the plates from falling out of the same when the drawer is held with that end down, a flat spring connecting said arm with said drawer and adapted to enter and move in the slot in the side wall of the hopper when the arm carried by said flat spring is withdrawn from the hopper, and means for withdrawing the address plates singly from said hopper and delivering them into the unobstructed open end of said drawer,— said plates having in each end a notch, and the drawer having on each side an internal longitudinally extended rib adapted to enter a notch in the end of a plate.

Signed at Cleveland, Ohio, this 23rd day of November, 1920.

CLIFTON CHISHOLM.